United States Patent
Houssat et al.

(10) Patent No.: US 10,196,046 B2
(45) Date of Patent: Feb. 5, 2019

(54) SUPPORT ELEMENT, WIPER BLADE AND WINDSCREEN WIPER OF A MOTOR VEHICLE

(71) Applicant: Valeo Systèmes d'Essuyage, Le Mesnil Saint Denis (FR)

(72) Inventors: Stéphane Houssat, Blanzat (FR); Vincent Gaucher, Ennezat (FR); Eric Poton, Pont du Chateau (FR); Olivier Jomard, Aubiere (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 15/245,443

(22) Filed: Aug. 24, 2016

(65) Prior Publication Data

US 2017/0057465 A1   Mar. 2, 2017

(30) Foreign Application Priority Data

Aug. 24, 2015   (FR) ..................... 15 57869

(51) Int. Cl.

| B60S 1/04 | (2006.01) |
|---|---|
| B60S 1/38 | (2006.01) |
| B60S 1/16 | (2006.01) |

(52) U.S. Cl.
CPC ............ B60S 1/3879 (2013.01); B60S 1/16 (2013.01); B60S 1/381 (2013.01); B60S 1/3851 (2013.01);
(Continued)

(58) Field of Classification Search
CPC ........ B60S 1/38; B60S 1/3849; B60S 1/3851; B60S 1/3856; B60S 1/3879; B60S 1/3889; B60S 1/3891
See application file for complete search history.

(56) References Cited

U.S. PATENT DOCUMENTS

| 8,959,700 | B2 * | 2/2015 | Yoshimoto | ............ B60S 1/3881 15/250.201 |
| 2004/0200026 | A1 * | 10/2004 | Shanmugham | ....... B60S 1/3801 15/250.452 |

(Continued)

FOREIGN PATENT DOCUMENTS

| EP | 1829758 A1 | 9/2007 | |
| FR | 2905650 A1 * | 3/2008 | ................ B60S 1/38 |

(Continued)

OTHER PUBLICATIONS

FR 2905650 Machine Translation.*
(Continued)

Primary Examiner — Tyrone V Hall, Jr.
(74) Attorney, Agent, or Firm — Osha Liang LLP

(57) ABSTRACT

The present invention concerns an elongated elastic support element 16 for a wiper blade 10 intended to be inserted in a support 14 for a wiper blade 10, the elongated elastic support element 16 being formed integrally between two longitudinal ends 16a and through which passes a median longitudinal plane P1, the elongated elastic support element comprising locking means 50 each intended to cooperate with a complementary locking member 56 carried by the wiper blade 10, and of which at least one locking means 50 is arranged at each longitudinal end 16a of the elongated elastic support element 16, characterized in that the locking means 50 comprise a single locking notch 50 per longitudinal end 16a, a first locking notch 50b extending from one side of the median longitudinal plane P1 and a second locking notch 50c extending from the other side of the median longitudinal plane P1.

The invention also concerns a wiper blade 10 and a windscreen wiper 1 of a motor vehicle comprising said blade.

15 Claims, 3 Drawing Sheets

(52) U.S. Cl.
CPC ........... *B60S 1/3881* (2013.01); *B60S 1/3889* (2013.01); *B60S 1/3891* (2013.01); *B60S 2001/3822* (2013.01)

(56) References Cited

U.S. PATENT DOCUMENTS

| | | | | |
|---|---|---|---|---|
| 2008/0127442 | A1* | 6/2008 | Jarasson | B60S 1/38 15/250.361 |
| 2008/0289133 | A1* | 11/2008 | Kim | B60S 1/387 15/250.32 |
| 2008/0295273 | A1* | 12/2008 | Lin | B60S 1/381 15/250.452 |
| 2009/0223010 | A1* | 9/2009 | Richey | B60S 1/381 15/250.32 |
| 2010/0242204 | A1* | 9/2010 | Chien | B60S 1/381 15/250.201 |
| 2012/0030894 | A1* | 2/2012 | Garrastacho | B60S 1/381 15/250.201 |
| 2012/0117746 | A1* | 5/2012 | Egner-Walter | B60S 1/3805 15/250.06 |
| 2012/0124767 | A1* | 5/2012 | Thielen | B60S 1/3889 15/250.361 |
| 2012/0311807 | A1* | 12/2012 | Criel | B60S 1/3891 15/250.15 |
| 2014/0224901 | A1 | 8/2014 | Bousset et al. | |

FOREIGN PATENT DOCUMENTS

| | | | | |
|---|---|---|---|---|
| FR | 2905650 A1 * | 3/2008 | | B60S 1/38 |
| FR | 2922502 A1 | 4/2009 | | |
| JP | 2007216735 A * | 8/2007 | | B60S 1/3889 |
| WO | WO 2007144220 A1 * | 12/2007 | | B60S 1/38 |

OTHER PUBLICATIONS

WO 2007144220 Machine Translation.*
Machine translation for FR2905650 (Year: 2008).*
Machine translation for JP2007216735 (Year: 2007).*
Preliminary Report Issued in Corresponding French Application No. 1557869, dated Jun. 17, 2016 (7 Pages).

* cited by examiner

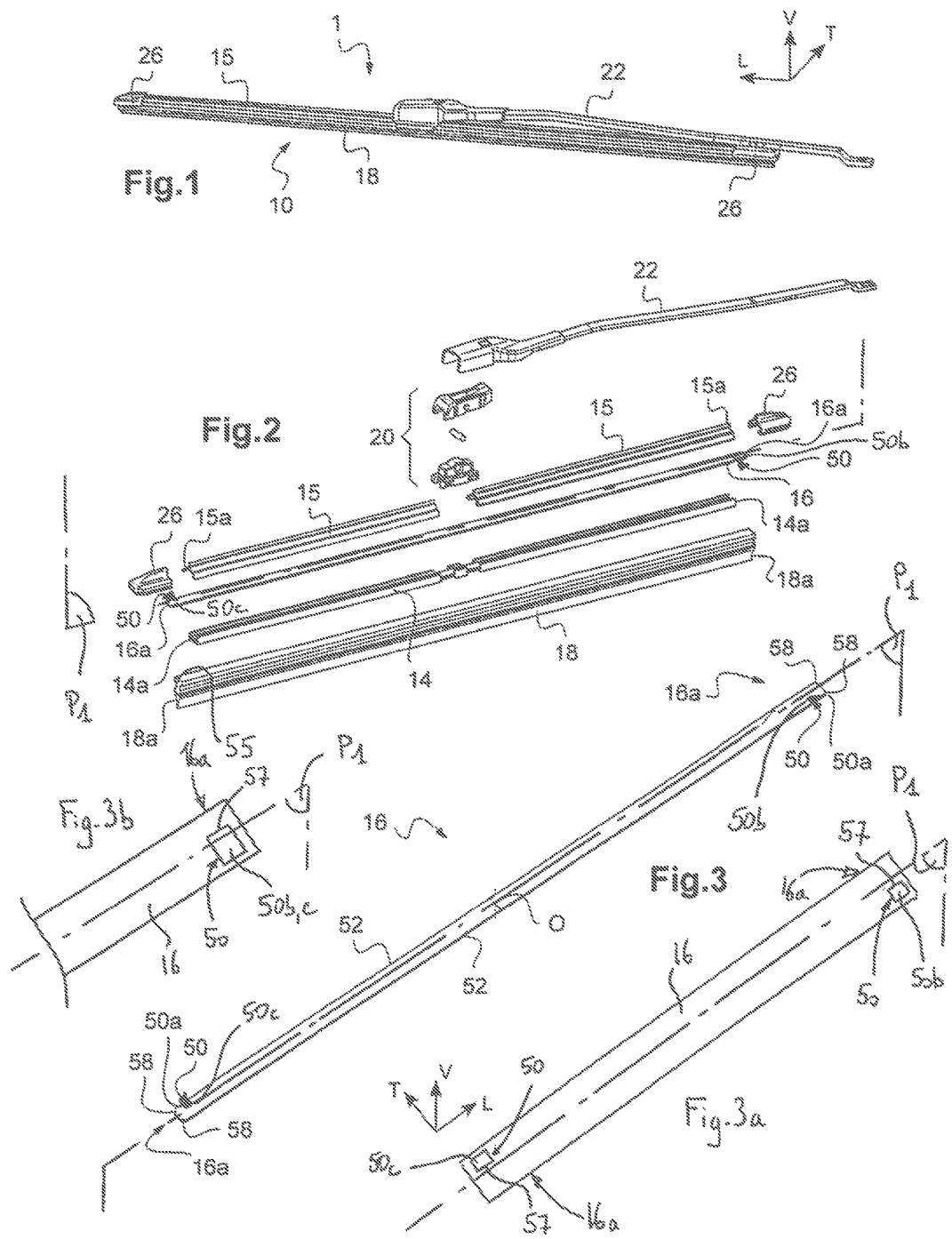

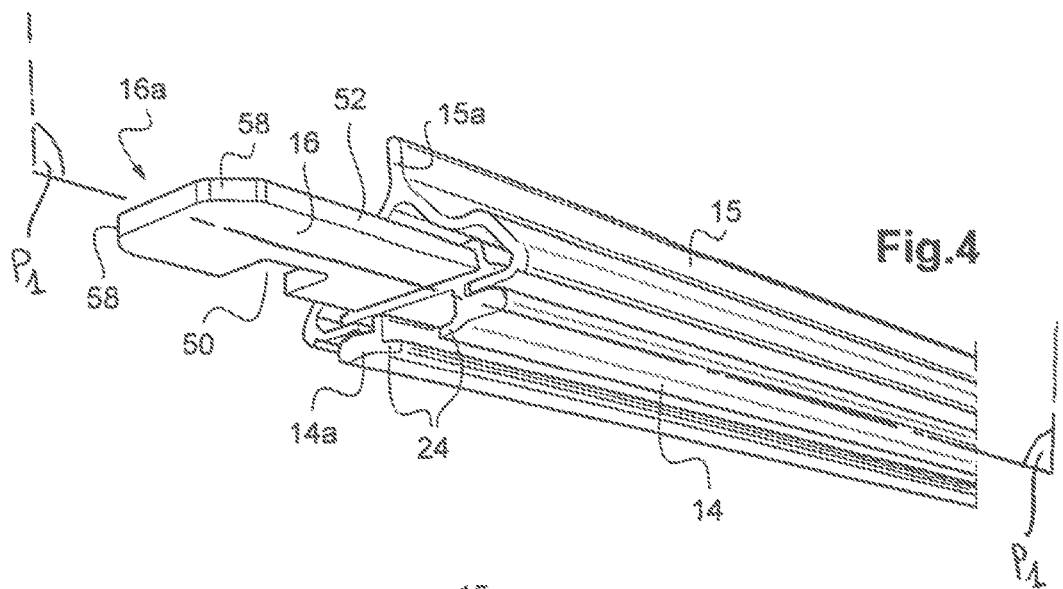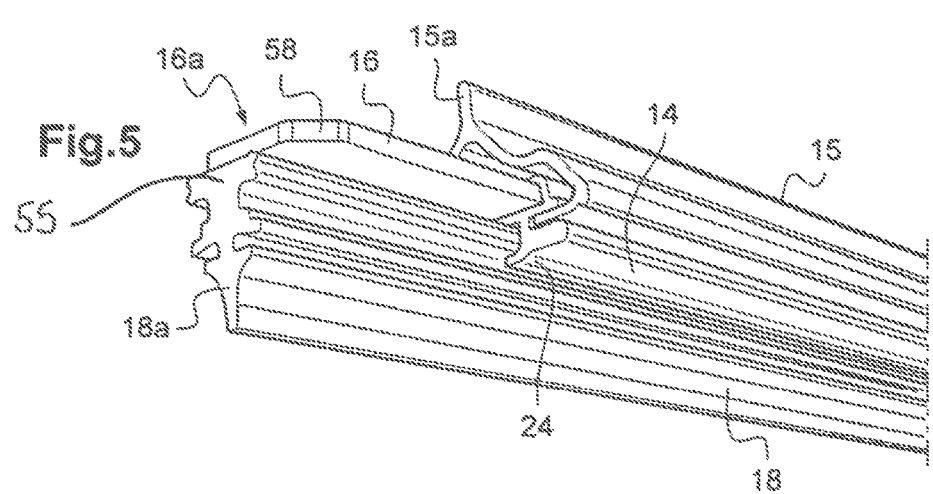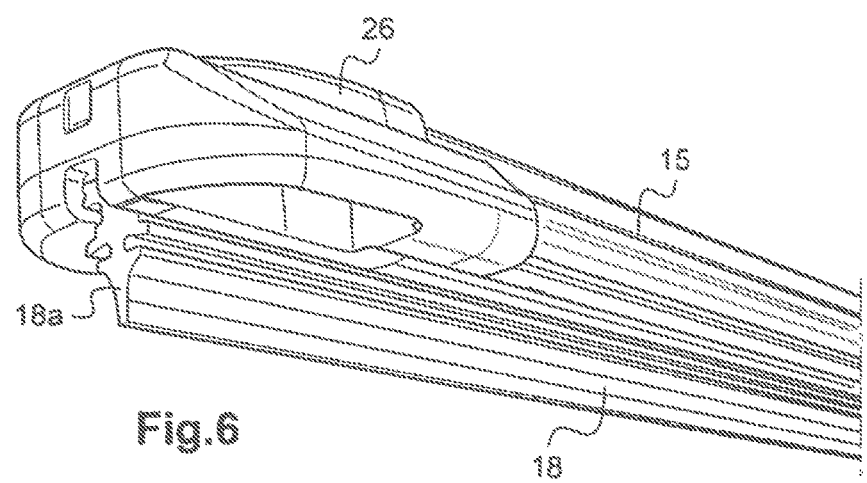

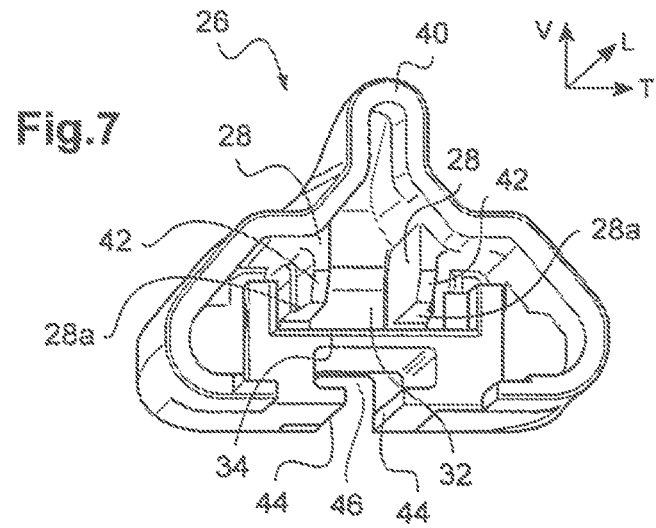
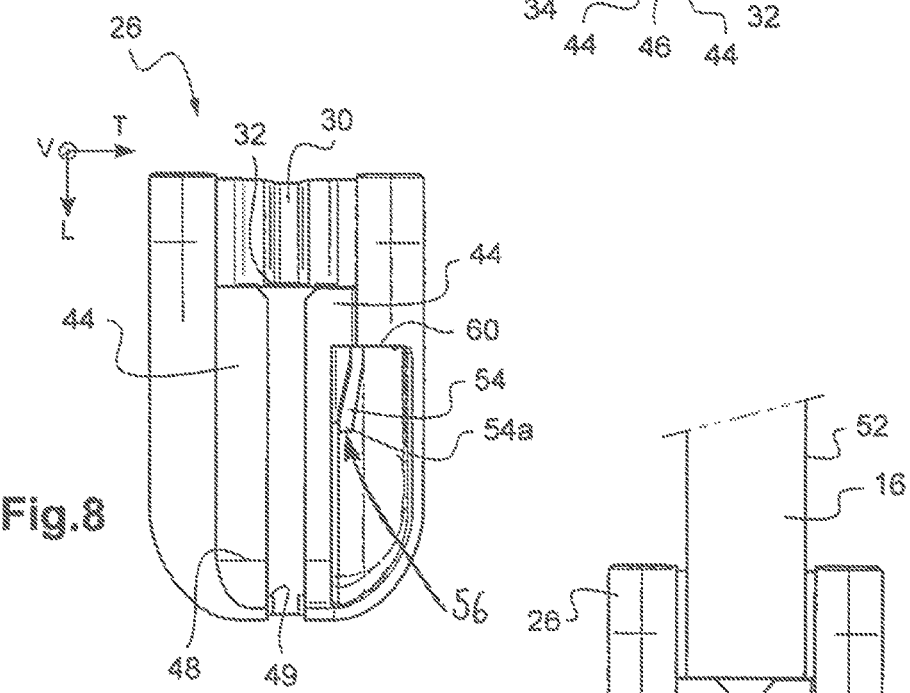
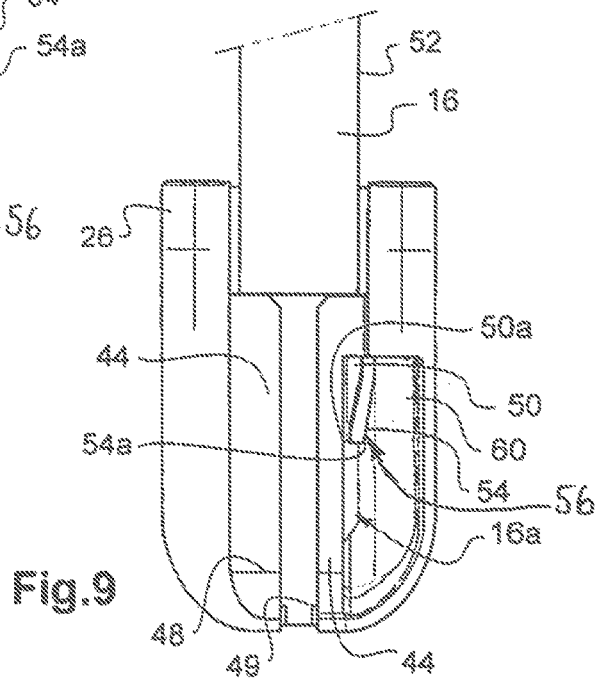

SUPPORT ELEMENT, WIPER BLADE AND WINDSCREEN WIPER OF A MOTOR VEHICLE

The invention concerns a support element for a wiper blade of a motor vehicle. The invention also concerns a wiper blade incorporating such a support element, and a windscreen wiper of a motor vehicle comprising said wiper blade.

A support element (for example a stiffening spine), a wiper rubber and a blade support are blade components which have a mainly longitudinal orientation. The support element and the rubber are introduced by sliding longitudinally into complementary longitudinal conduits of the support. The support element and the rubber are blocked longitudinally in the support conduits by end sleeves mounted on each end of the blade. Each sleeve is designed so that it can be locked onto the associated end of the support element.

Conventionally, the sleeve is locked in the engaged position on the support element via a notch produced in a longitudinal edge of the spine, receiving an associated locking member.

The two ends of the support element each comprise a notch, and the two notches are made in the same longitudinal edge of the support element. Thus it is known to produce each sleeve depending on the end of the blade on which the sleeve is intended to be mounted. Therefore the two sleeves which must be mounted on a blade are different, which poses problems of increasing the number of devices used to produce the blade components.

Document FR 2 922 502 thus describes an end sleeve with two locking means produced symmetrically such that the end sleeve can be mounted on either of the two ends of the support element. The blade then comprises two identical end sleeves mounted one on each of its ends. However these end sleeves with symmetrical locking are complex to produce and therefore costly. In fact, moulding the two locking means, both of which must be flexible and operational, requires complex moulds and moulding operations which the invention described below simplifies.

One aim of the present invention is therefore to simplify the windscreen wiper blades of the prior art.

To this end, the object of the present invention is an elongated elastic support element for a wiper blade intended to be inserted in a support for a wiper blade, the elongated elastic support element being formed integrally between two longitudinal ends and through which passes a median longitudinal plane, the elongated elastic support element comprising locking means each intended to cooperate with a complementary locking member carried by the wiper blade, and of which at least one locking means is arranged at each longitudinal end of the elongated elastic support element, characterized in that the locking means comprise a single locking notch per longitudinal end, a first locking notch extending from one side of the median longitudinal plane and a second locking notch extending from the other side of the median longitudinal plane.

The end sleeve may therefore have a single locking member and be mounted on either of the two ends of the elongated elastic support element. The end sleeve is therefore the same for both longitudinal ends of the wiper blade. The wiper blade of the invention can be identified by the fact that the end sleeves are of identical design, i.e. produced in the same mould for example.

Identical end sleeves which can be mounted on any longitudinal end of the wiper blade reduce the number of devices used to produce the components of the wiper blade.

Furthermore, an end sleeve with a single locking member is easier to produce and therefore cheaper than a sleeve of the prior art with symmetrical locking means.

The elongated elastic support element is for example one or more stiffening spines, a blade support mount or a combination of this stiffening spine housed in this support mount.

According to an exemplary embodiment, the positioning of the locking notches gives the elongated elastic support element a central symmetry relative to a centre of the elongated elastic support element. There is at least one diagonal passing through one and the same point of each of the locking notches and passing through the centre of the support element.

According to a variant embodiment, at least one of the locking notches is arranged on one of the lateral edges delimiting the elongated elastic support element. It is understood here that the locking notch opens at the level of the longitudinal lateral edge which delimits the spine. This locking notch is therefore open on the longitudinal side of the spine. Naturally, the invention covers the case where both single locking notches are arranged opening on the lateral edge concerned of the support element.

Alternatively, at least one of the locking notches is delimited by a closed circumferential edge. The locking notch is then for example a hole with closed perimeter, offset laterally towards or in the interior of the stiffening spine. Here again, the invention covers the case where both single locking notches have a closed perimeter.

In either case, the locking notch may pass through the support element.

According to one possibility of the invention, at least one of the locking notches intersects with the median longitudinal plane. Although formed on either side of the median longitudinal plane at each respective longitudinal end of the spine, the locking notch may straddle the median longitudinal plane.

The longitudinal ends of the stiffening spine may be chamfered to facilitate introduction of the stiffening spine in the end sleeve and/or the blade support.

The invention also concerns a wiper blade, characterized in that it comprises an elongated elastic support element according to any of the definitions above. Preferably, the wiper blade according to the invention comprises a single elongated elastic support element according to any of the definitions above, more preferably housed in a support mount of the windscreen wiper blade. This latter advantageous design allows a reduction in the number of blade components and hence its unit cost.

The wiper blade according to the invention may comprise any of the characteristics below taken alone or in combination:
 in such a wiper blade, at least one end sleeve is provided which carries the complementary locking member of the locking means arranged on the elongated elastic support element,
 the end sleeve comprises a housing receiving the longitudinal end of the support element, the locking member protruding from a side of the housing to cooperate with the locking notch of the support element in order to lock this support element in the position engaged in the housing, the locking member of the end sleeve comprises a single elastic tab; in other words, the end sleeve comprises a single elastic locking tab, the elastic tab moves in a plane substantially perpendicular to the median longitudinal plane, the elastic tab moves in a plane substantially parallel to the median longitudinal plane, the housing of the end sleeve comprises an opening arranged level with the locking member, one and the same wiper blade comprises two end sleeves each attached to a longitudinal end of the support element, the end sleeves being identical in design, the end sleeve is obtained by moulding, the locking element of the end sleeve can be released to allow removal of the end sleeve from the longitudinal end of the wiper blade.

The object of the invention is also a windscreen wiper, characterized in that it comprises a wiper blade as described above and an actuating arm for driving the wiper blade in a pivoting movement.

Further characteristics and advantages of the invention will appear from the following description, given merely as an example and without limitative nature, with reference to the attached drawings on which:

FIG. 1 is a diagrammatic perspective depiction of a wiper blade connected to a wiper drive arm, FIG. 2 is an exploded view of the windscreen wiper in FIG. 1, FIG. 3 is a perspective view of the elongated elastic support element or stiffening spine of the wiper blade of FIG. 1, FIGS. 3a and 3b are diagrammatic views illustrating different embodiments of the locking means, FIG. 4 is a partial view of a blade support or blade support mount and of an air deflector connected to an elongated elastic support element of the blade or stiffening spine, FIG. 5 shows the elements of FIG. 4 connected to a wiper rubber, FIG. 6 shows the elements of FIG. 5 connected to an end sleeve, FIG. 7 shows a perspective front view of the end sleeve of FIG. 6, FIG. 8 shows a top view of the end sleeve of FIG. 7, and FIG. 9 shows a view similar to FIG. 8 with a longitudinal end of an elongated elastic support element or stiffening spine inserted in the end sleeve.

In the description which follows, the directions longitudinal, vertical and transverse are used in a non-limitative fashion, and are shown on FIG. 1 by the trihedral (L, V, T) which is fixed relative to the windscreen wiper 1. The longitudinal direction L corresponds to the main direction of the windscreen wiper. In the description below, identical or similar elements are designated by the same reference numerals.

The embodiments below are exemplary. Although the description refers to one or more embodiments, this does not necessarily mean that each reference concerns the same embodiment, or that the characteristics apply only to a single embodiment. Individual characteristics of different embodiments may also be combined to produce further embodiments.

FIG. 1 shows a windscreen wiper 1 of a motor vehicle which comprises a drive arm 22, at the free end of which a wiper blade 10 is mounted in articulation.

The wiper blade 10 is a flat blade, i.e. with a connection means which is attached to a central point of the wiper blade. Here it is of mainly longitudinal orientation.

As can be seen on FIG. 2, the wiper blade 10 comprises a support, an exemplary embodiment of which is a support mount 14. The description below relates to this exemplary embodiment, but it is understood that the support in general may be substituted for the support mount.

The wiper blade, and hence the elongated elastic support element, extends along a longitudinal plane P1 which is median in the sense that it cuts the elongated elastic support element into two transversely equal parts.

The wiper blade 10 also comprises a longitudinal stiffening spine 16 which also forms an exemplary embodiment of the elongated elastic support element. This element is elastic in the sense that it is able to resume a rest position after being subjected to a force intended to bend the element. It is also elongated in the sense that it extends longitudinally over the length of the wiper blade 10. In the description below, the term "stiffening spine" is used but this could be replaced by the term "elongated elastic support element", which is the subject of the invention.

This stiffening spine 16 may be arranged in the support mount 14 which forms an exemplary embodiment of the support or structure of the blade 10 itself.

The support mount 14 carries a connection device 20 for mounting and articulating the wiper blade 10 in a pivot movement on the free end of the drive arm 22, and a wiper rubber 18 which is made of a flexible material and able to come into contact with the glazed panel to be wiped.

The support mount 14 also comprises or receives an air deflector 15 which is shaped aerodynamically such that the relative wind produced by the movement of the vehicle creates a force which tries to press the wiper blade 10 against the glazed panel. The air deflector 15 is for example formed of two parts joined to the support mount 14 on either side of the connection device 20. It is noted that the air deflector 15 may be secured by a mechanical operation to the support mount 14. Alternatively, the support mount 14 and the air deflector 15 may be co-moulded or co-extruded such that they cannot be separated from each other without destroying one or the other of the elements.

The stiffening spine 16 is formed integrally of one body. This stiffening spine is a metallic strip which is curved in a plane perpendicular to the glazed panel to be wiped, such that when the wiper blade 10 is resting on the glazed panel, the support forces exerted by the drive arm 22 are distributed over the entire length of the wiper rubber 18.

The stiffening spine 16 is also carried by the support mount 14. To this end, and as can be best seen on FIG. 4, the support mount 14 comprises a longitudinal central conduit which receives the stiffening spine 16.

The longitudinal central conduit runs over two lower, mutually opposing hooks 24 which delimit a lower longitudinal conduit open towards the bottom, in which a claw 55 of the wiper rubber 18 is received. The stiffening spine 16 and the wiper rubber 18 are introduced in the respective conduits of the support mount 14 in a longitudinal sliding movement. When the stiffening spine 16 and the wiper rubber 18 are in the mounted position in the support mount 14, their longitudinal ends 16a, 18a protrude longitudinally relative to the associated longitudinal end 14a of the support mount 14, as can be seen in FIG. 5.

Each longitudinal end of the wiper blade 10 carries an end sleeve 26 which ensures the blocking of the stiffening spine 16 and the wiper rubber 18 in a direction along the longitudinal direction of the blade, by blocking the longitudinal sliding in a direction relative to the support mount 14 and the air deflector 15, and which improves the overall aesthetic and aerodynamic aspect of the wiper blade 10 (FIG. 6).

The end sleeve 26 is for example made of polymer material and may be obtained by moulding.

As can be seen in more detail in FIGS. 7 and 8, each end sleeve 26 delimits a hollow body in which the longitudinal ends 14a, 16a of the support mount 14 and the stiffening spine 16 are received.

Each hollow body comprises a mount housing 30 in which the longitudinal end 14a of the support mount 14 and of the air deflector 15 are received. The hollow body also comprises a spine housing 32 extending longitudinally behind the mount housing 30, and in which the longitudinal end 16a of the stiffening spine 16 is received. It is the is housing 32 which receives the longitudinal end 16a of the support element 16.

The spine housing 32 is in particular delimited by two lower edges of two longitudinal parallel ribs 28 which extend from an upper well 40 of the hollow body. The end 42 of each lower edge 28a of the ribs 28 may also be chamfered to facilitate introduction of the stiffening spine 16 in the spine housing 32.

Each rib 28 also forms a longitudinal stop for the end sleeve 26 against the longitudinal end 15a of the air deflector 15.

The end sleeve 26 also comprises two longitudinal hooks 44 which extend downwards from the base 34 of the spine housing 32, and which are curved transversely towards the inside so as to delimit a lower housing 46 in which the upper back of the wiper rubber 18 can be received.

The end sleeve 26 also comprises a first transverse vertical stop 48 which closes an end of the spine housing 32 so as to form a longitudinal stop for the stiffening spine 16. The end sleeve 26 comprises a second transverse vertical stop 49 which closes an end of the lower housing 46 so as to form a longitudinal stop for the wiper rubber 18.

Thus when the two end sleeves 26 are mounted at the two longitudinal ends of the wiper blade 10, they are firmly attached to the stiffening spine 16 and each end sleeve 26 forms a stop for the support mount 14, the air deflector 15 and wiper rubber 18 when sliding longitudinally forwards or backwards, and consequently prevents the stiffening spine 16 and/or wiper rubber 18 from detaching from the support mount 14.

To achieve the blocking of the stiffening spine 16 and secondarily of the wiper rubber 18 relative to the support mount 14, the end sleeve 26 comprises a locking member 56 which cooperates with a locking means 50 arranged at one end of the elongated elastic support element. According to the invention, there are two locking means 50, a first notch marked 50b which is arranged at a first longitudinal end 16a of the elongated elastic support element, and a second locking notch 50c which is arranged at a second longitudinal end 16a of the elongated elastic support element opposite the first longitudinal end relative to the body of the elongated elastic support element.

According to one embodiment, the first locking means and/or the second locking means is a locking notch 50b, 50c carried by a longitudinal end 16a of the stiffening spine 16, to lock the longitudinal end 16a of the stiffening spine 16 in the position engaged in the spine housing 32.

As can be seen from FIG. 3, this locking notch 50c, 50b is made in a lateral edge 52, or opens into this lateral edge 52, of a longitudinal end 16a of the stiffening spine 16, and extends transversely towards the inside of the stiffening spine 16.

Alternatively, as shown on FIG. 3a, the locking notch or notches 50b, 50c are a hole delimited by or surrounded by a closed circumferential edge 57, produced in the stiffening spine 16.

FIG. 3b illustrates another possibility of the invention which is applicable to the embodiment where the locking notch 50b, 50c opens at the level of the lateral edge 52, and to the embodiment where the locking notch 50b, 50c is delimited by the circumferential edge 57. According to this possibility, the locking notch 50b, 50c intersects with the median longitudinal plane P1. In other words, the locking notch 50b, 50c is a single element and extends mainly over a transverse half portion of the stiffening spine 16, a part of the locking notch 50b, 50c being cut or traversed by the median longitudinal plane P1.

In the cases described above, the transverse and longitudinal positioning of the locking notch 50b, 50c relative to the elongated elastic support element 16 is identical at both longitudinal ends 16a of this support element.

Each longitudinal end 16a of the stiffening spine 16 comprises only one single locking notch 50b, 50c.

The two locking notches 50b, 50c are respectively produced in opposing lateral edges 52 of a longitudinal end 16a of the body of the stiffening spine 16, as can be seen from FIG. 3, giving the stiffening spine 16 a central symmetry relative to the centre O of the stiffening spine 16. The same applies to the embodiment with the locking notch with closed perimeter.

The locking member 56 of the end sleeve 26 protrudes over a side of the spine housing 32 to cooperate with a locking notch 50b, 60c of the stiffening spine 16 in order to lock the stiffening spine 16 in the position engaged in spine housing 32.

As can be seen on FIG. 9, the locking member 56 of the end sleeve 26 comprises for example an elastic tab 54, which extends substantially longitudinally and which is curved towards the inside of the spine housing 32 in a plane perpendicular or substantially perpendicular to the median longitudinal plane P1, such that the free end 54a of the elastic tab 54 can be received in the associated locking notch 50b, 50c of the stiffening spine 16.

The elastic tab 54 is able to deform elastically towards the outside of the spine housing 32 when the longitudinal end 16a of the stiffening spine 16 is introduced in the spine housing 32. The elastic tab 54 is made in a lateral wall of the spine housing 32 such that its free end 54a is movable transversely when the stiffening spine 16 is introduced into the spine housing 32.

For this, the free end 54a of the tab 54 rests against the lateral edge 52 of the stiffening spine 16. Then when the stiffening spine 16 is in its position mounted in the spine housing 32, the locking notch 50 is situated at the level of the free end 54a of the elastic tab 54. The elastic tab 54 than returns elastically towards its initial configuration, such that its free end 54a is opposite a transverse face 50a of the locking notch 50b, 50c. When the stiffening spine 16 tries to leave the spine housing 32, the transverse face 50a of the locking notch 50b, 50c comes to rest against the free and 54a of the elastic tab 54.

Alternatively, the elastic tab 54 is arranged to move and perform its blocking function in a plane parallel or substantially parallel to the median longitudinal plane P1. Instead of moving transversely towards the lateral edge 52 of the stiffening spine 16, the elastic tab 54 moves towards a large longitudinal face delimiting said spine.

The end sleeve 26 is thus produced so that it can be mounted on either of the two longitudinal ends 10a of the wiper blade 10.

To assist the insertion of the stiffening spine 16 in the spine housing 32 of the end sleeve 26, each longitudinal end 16a of the stiffening spine 16 may comprise chamfers 58, for example two.

The chamfers 58 of the longitudinal ends 16a of the stiffening spine 16 also promote the transverse deformation of the elastic tab 54 towards the outside on insertion of the longitudinal end 16a, the chamfer 58 forming a ramp on which the free end 54a of the elastic tab 54 rests.

The locking member of the end sleeve 26 may be releasable to allow removal of the free end 26 from the longitudinal end 10a of the wiper blade 10. This allows in particular removal of the wiper rubber 18 from the support mount 14 when worn, to be replaced by a new wiper rubber 18.

For this, the end sleeve 26 is produced to allow passage of a tool, such as a screwdriver, in order to cause deformation of the elastic tab 54 which cooperates with the locking notch so as to release the free end 54a of the elastic tab 54 from the locking notch 50b, 50c. The longitudinal end 16a of the stiffening spine 16 is then no longer blocked by the elastic tab 54 and can leave the spine housing 32.

As can be seen on FIGS. 8 and 9, the spine housing 32 may be open towards the bottom at the level of the elastic tab 54. The base of the spine housing 32 thus comprises an opening 60 arranged at the level of the elastic tab 54. Furthermore, in order for the longitudinal hooks 44 not to obstruct access to the elastic tab 54, the opening 60 is arranged transversely next to the longitudinal hooks 44, as can be seen on FIGS. 8 and 9.

The end sleeve 26 may thus have a single locking member and be mounted on either of the two ends 16a of the stiffening spine 16. The end sleeve 26 is therefore the same for both longitudinal ends 10a of the wiper blade 10.

Identical end sleeves 26 which can be mounted on any longitudinal end 10a of the wiper blade 10 reduce the number of devices used to produce the components of the wiper bade 10. In addition, an end sleeve 26 with a single locking member is easier to produce and hence cheaper than a sleeve of the prior art with symmetrical locking means.

The invention claimed is:

1. An elongated elastic support element for a wiper blade intended to be inserted in a support for a wiper blade having two identical end sleeves, the elongated elastic support element being formed integrally between two longitudinal ends and through which passes a median longitudinal plane, the elongated support element comprising:
locking means each intended to cooperate with a complementary locking member carried by two end sleeves of the wiper blade and of which at least one locking means is arranged at each longitudinal end of the elongated elastic support element,
wherein the locking means consist of a single locking notch formed on each longitudinal end of the elongated support element and are asymmetrical with respect to the median longitudinal plane, wherein a first locking notch extends from a first side of the median longitudinal plane and a second locking notch extends from a second side opposite the first side of the median longitudinal plane, and
wherein the first and second locking notches are positioned at a same distance from the corresponding longitudinal ends to have a central symmetry relative to a centre of the elongated elastic support element, the central symmetry allowing the two end sleeves, cooperating with the first and second locking notches, to be identical in design.

2. The support element according to claim 1, wherein the elongated elastic support element comprises a diagonal passing through the first locking notch, the centre of the elongated elastic support element, and the second locking notch to form the central symmetry.

3. The support element according to claim 1, wherein at least one of the locking notches is arranged on one of lateral edges delimiting the elongated elastic support element.

4. The support element according to claim 1, wherein at least one of the locking notches is delimited by a closed circumferential edge.

5. The support element according to claim 1, wherein at least one of the locking notches intersects with the median longitudinal plane.

6. The support element according to claim 1, wherein the longitudinal ends of the elongated elastic support element are chamfered.

7. A wiper blade comprising elongated elastic support element according to claim 1.

8. The wiper blade according to claim 7, wherein at least one end sleeve is provided which carries the complementary locking member of the locking means arranged on the elongated elastic support element.

9. The wiper blade according to claim 8, wherein the end sleeve comprises a housing receiving the longitudinal end of the support element, the locking member protruding from a side of the housing to cooperate with the locking notch of the support element in order to lock this support element in a position engaged within the housing.

10. The wiper blade according to claim 9, wherein the locking member of the end sleeve comprises a single elastic tab.

11. The wiper blade according to claim 10, wherein the elastic tab is configured to move in a plane substantially perpendicular to the median longitudinal plane.

12. The wiper blade according to claim 10, wherein the elastic tab is configured to move in a plane substantially parallel to the median longitudinal plane.

13. The wiper blade according to claim 8, wherein the housing of the end sleeve comprises an opening arranged level with the locking member.

14. The wiper blade according to claim 7, comprising two end sleeves each attached to a longitudinal end of the support element, the end sleeves being identical in design.

15. A windscreen wiper comprising: a wiper blade according to claim 7; and an actuating arm to drive the wiper blade in a pivoting movement.

* * * * *